US009964458B2

(12) United States Patent
Chiou et al.

(10) Patent No.: US 9,964,458 B2
(45) Date of Patent: May 8, 2018

(54) PRESSURE SENSOR DEVICE WITH ANCHORS FOR DIE SHRINKAGE AND HIGH SENSITIVITY

(71) Applicant: Continental Automotive Systems, Inc., Auburn Hills, MI (US)

(72) Inventors: Jen-Huang Albert Chiou, Libertyville, IL (US); Shiuh-Hui Steven Chen, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 148 days.

(21) Appl. No.: 15/153,483

(22) Filed: May 12, 2016

(65) Prior Publication Data
US 2017/0328797 A1    Nov. 16, 2017

(51) Int. Cl.
*G01L 9/00* (2006.01)
*G01L 9/02* (2006.01)
*G01L 9/08* (2006.01)
*G01L 19/04* (2006.01)

(52) U.S. Cl.
CPC .................. *G01L 9/0055* (2013.01)

(58) Field of Classification Search
CPC . G01L 9/00; G01L 9/0055; G01L 9/02; G01L 9/04; G01L 9/06; G01L 9/08; G01L 19/00; G01L 19/08; G01L 19/04
See application file for complete search history.

(56) References Cited

U.S. PATENT DOCUMENTS

| 4,236,137 | A | 11/1980 | Kurtz et al. |
| 5,156,052 | A | 10/1992 | Johnson et al. |
| 5,178,016 | A | 1/1993 | Dauenhauer et al. |
| 5,257,546 | A | 11/1993 | Tobita et al. |
| 6,006,607 | A | 12/1999 | Bryzek et al. |
| 6,093,579 | A | 7/2000 | Sathe |
| 8,881,596 | B2 | 11/2014 | Chiou et al. |
| 2003/0074973 | A1 | 4/2003 | Kurtz et al. |
| 2006/0144153 | A1 | 7/2006 | Brosh |
| 2011/0023618 | A1* | 2/2011 | Chiou .................. G01L 9/0042 73/727 |
| 2011/0146411 | A1* | 6/2011 | Doering ............... G01L 9/0047 73/727 |
| 2011/0260163 | A1 | 10/2011 | Solzbacher et al. |
| 2013/0087864 | A1 | 4/2013 | Ten Have |
| 2015/0330856 | A1 | 11/2015 | Chiou et al. |
| 2016/0146685 | A1 | 5/2016 | Chiou et al. |

FOREIGN PATENT DOCUMENTS

| DE | 262282 A1 | 11/1988 |
| DE | 69700021 T2 | 1/1999 |
| DE | 60110928 T2 | 4/2006 |

(Continued)

OTHER PUBLICATIONS

Search Report dated Nov. 22, 2016, from corresponding GB Patent Application No. GB1610850.8.

*Primary Examiner* — Nguyen Ha

(57) ABSTRACT

The voltage output span and sensitivity from a MEMS pressure sensor are increased and pressure nonlinearity is reduced by thinning a diaphragm and forming the diaphragm to include anchors that are not connected to or joined to diaphragm-stiffening beams or thickened regions of the diaphragm.

18 Claims, 8 Drawing Sheets

(56) References Cited

FOREIGN PATENT DOCUMENTS

| | | | |
|---|---|---|---|
| DE | 102005061142 A1 | 6/2007 | |
| DE | 102007012106 A1 | 9/2007 | |
| EP | 3029443 A1 | 6/2016 | |
| GB | 2532806 | 6/2016 | |
| JP | 59083023 A * | 5/1984 | ........... G01L 9/0042 |
| JP | S5983023 A | 5/1984 | |

* cited by examiner

| | 7 um DIAPHRAGM THICKNESS | | | 10 um DIAPHRAGM THICKNESS | | |
|---|---|---|---|---|---|---|
| DESIGN | SPAN (mV) | SPAN RATIO | PNL (%) | SPAN (mV) | SPAN RATIO | PNL (%) |
| FLAT DIAPHRAGM | 22.36 | 1 | -0.20 | 12.43 | 1 | -0.0819 |
| TOPSIDE CROSS | 32.99 | 1.48 | -0.11 | 17.35 | 1.40 | -0.0756 |
| TOPSIDE ANCHOR | 43.14 | 1.93 | 0.31 | 22.39 | 1.80 | 0.02 |

FIG. 9

PRESSURE SENSOR DEVICE WITH ANCHORS FOR DIE SHRINKAGE AND HIGH SENSITIVITY

BACKGROUND

Micro-electromechanical system (MEMS) pressure sensors are well known. For example, U.S. Pat. No. 4,236,137 to Kurtz, et al. discloses a semiconductor pressure transducer. U.S. Pat. No. 5,156,052 issued to Johnson, et al. also discloses a solid state pressure transducer. U.S. Pat. No. 6,006,607 issued to Bryzek, et al. discloses a pressure sensor that uses a piezoresistive device. U.S. Pat. Nos. 5,178,016 and 6,093,579 also discloses solid state pressure sensors. See also U.S. Pat. No. 8,881,596 entitled, "Semiconductor sensing device to minimize thermal noise," which is owned by the Applicant of this application and which is also incorporated by reference in its entirety.

A well-known problem with prior art MEMS pressure sensors is pressure nonlinearity or "PNL." PNL is a function of the silicon diaphragm's deflection. Diaphragm deflection, however, determines a MEMS pressure sensor's ability to detect small pressure changes. Unfortunately, as diaphragm deflection increases, so does output nonlinearity. See for example, U.S. pre-grant publication 20150330856, entitled, "PRESSURE SENSOR DEVICE WITH HIGH SENSITIVITY AND HIGH ACCURACY," published Nov. 19, 2015, assigned to the same applicant and incorporated herein by reference in its entirety.

Sensitivity becomes more problematic due to a smaller diaphragm in a shrunken MEMS pressure sensor that is required to sense low pressures, i.e., pressures below about 100 kPa. A solid state piezoresistive pressure sensor that can be used at low pressures and which has a smaller diaphragm in a smaller die with an improved output linearity and which is more sensitive than those in the prior art would be an improvement.

BRIEF DESCRIPTION OF THE FIGURES

FIG. 9 is a chart of output voltage spans, span ratios, pressure and nonlinearity percentages for prior art MEMS pressure sensing elements, the pressure sensing element described herein and using both 7 micrometer and 10 micrometer thicknesses;

DETAILED DESCRIPTION

For clarity purposes, pressure nonlinearity or "PNL" is considered herein to be the maximum voltage difference between an idealized linear voltage output and an actual voltage output from a MEMS pressure sensor embodied as a Wheatstone bridge circuit formed from piezoresistors. The maximum difference in the real voltage output from an idealized linear voltage output divided by the full scale or simply "span" defines a PNL.

Figure 1:
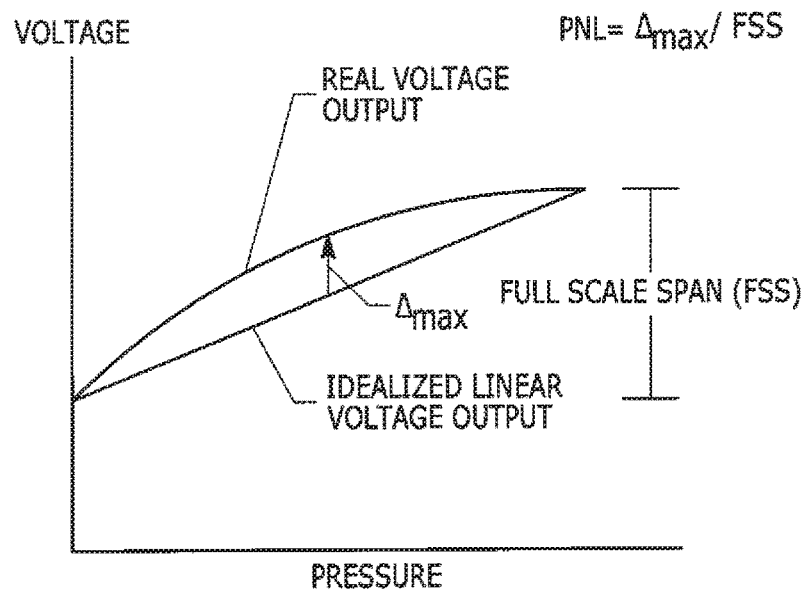
FIG. 1 is a graph showing pressure nonlinearity or PNL which is a difference in the real output voltage of the MEMS pressure sensor across a linear voltage output range divided by the full scale span output voltage.

FIG. 1 is a graph depicting how PNL is determined. Paraphrased, PNL is determined as the maximum output voltage deviation of a MEMS pressure sensor from an ideal linear output voltage over a range of input pressures. As shown in FIG. 1, PNL is expressed as:

Those of ordinary skill in the MEMS pressure sensor art know that PNL should be reduced as low as possible, usually to less than about 1.5% for automotive applications.

Figure 2:
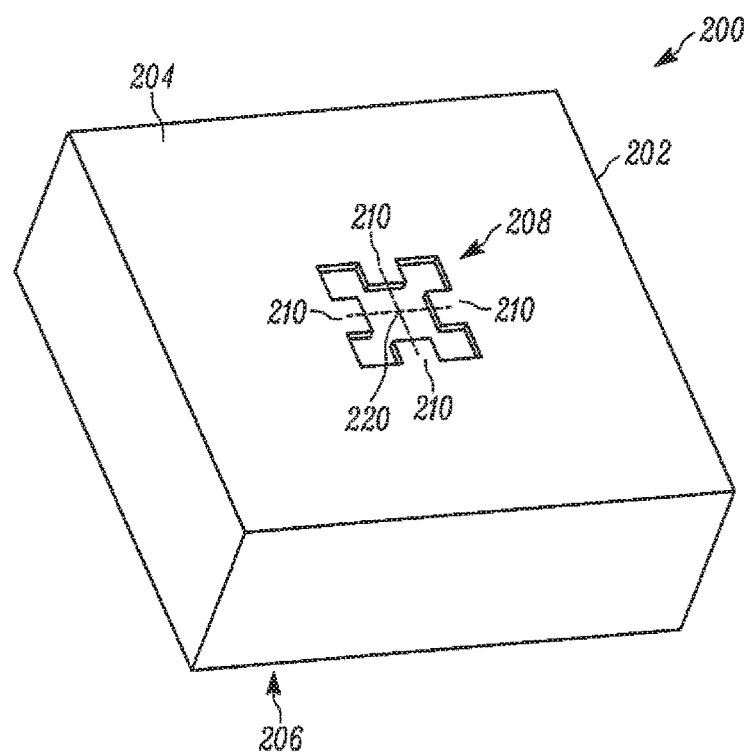
FIG. 2 is a perspective view of a first embodiment of a pressure sensing element having a cavity formed into the bottom of a substrate which confines a diaphragm in the substrate, the top of which is formed to have a recess with anchors.

FIG. 2 depicts a first embodiment of a pressure sensing element 200, which comprises a cube-shaped substrate 202 having a top surface 204 and a bottom surface 206. The substrate 202 also has a recess 208 etched into the top surface 204, the recess 208 being sized and shaped to define four, "anchors," which are substantially rectangular-shaped blocks or cuboids identified by reference numeral 210. Unlike the pressure sensing elements disclosed in the Applicant's co-pending applications noted above, the anchors disclosed herein are not connected or coupled to each other with or by, a diaphragm stiffener that extends between opposing anchors.

In FIG. 2, the anchors 210 are spaced apart from each other "in" the recess 208 such that each of the anchors 210 is located near each diaphragm edge center. Stated another way, each two anchors 210 opposite from each other are evenly spaced on the diaphragm 208.

Figure 3:
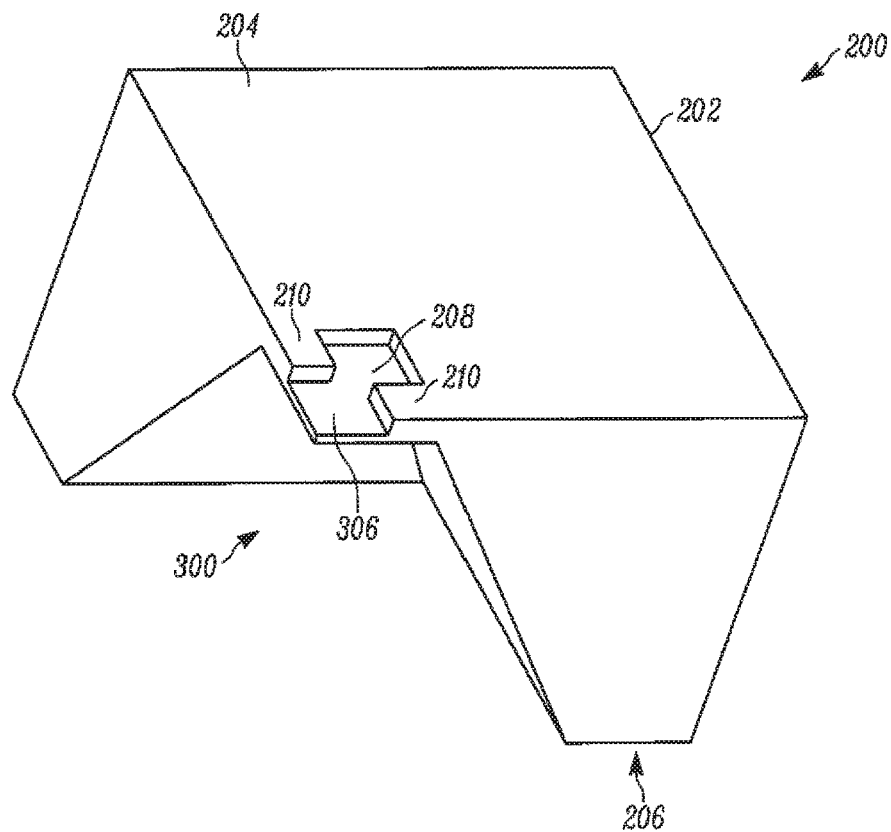
FIG. 3 is a cutaway view of the pressure sensing element of FIG. 2 showing one-quarter thereof.

FIG. 3 is a perspective view of a quarter-section of the pressure sensing element 200 shown in FIG. 2. The bottom side 206 of the substrate 202 can be seen in FIG. 3 as having a substantially pyramid-shaped cavity 300 formed into the bottom side 206 of the substrate 202. The sides of the cavity 300 are slightly inclined as a consequence of the etching process by which the cavity is formed.

Figure 4:
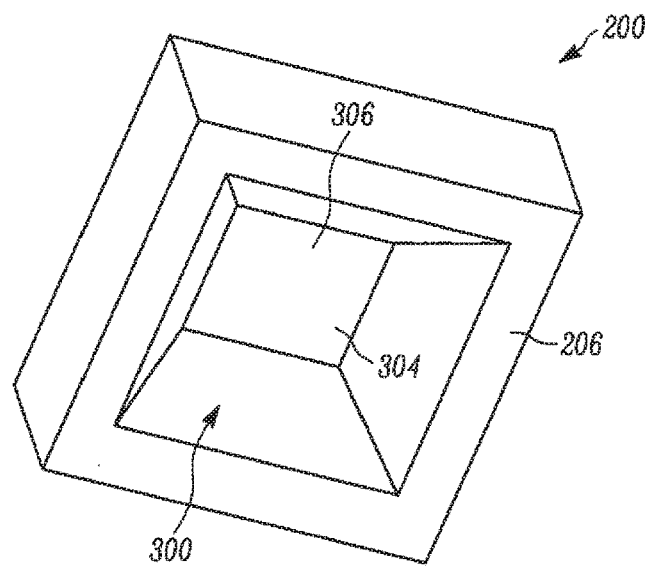
FIG. 4 is a bottom view of the pressure sensing element depicted in FIG. 2.

FIG. 4 is a perspective view of the bottom side 206 of the pressure sensing element 200 shown in FIG. 2. The cavity 300 extends from the bottom surface 206 upwardly through most of the material from which the substrate 202 is made. The depth of the cavity 300 is selected such that material not etched away and left at the top 304 of the cavity 300 defines a substantially square-shaped diaphragm 306, the thickness of which is between about 7.0 micrometers up to about 15.0 micrometers.

Figure 5A:
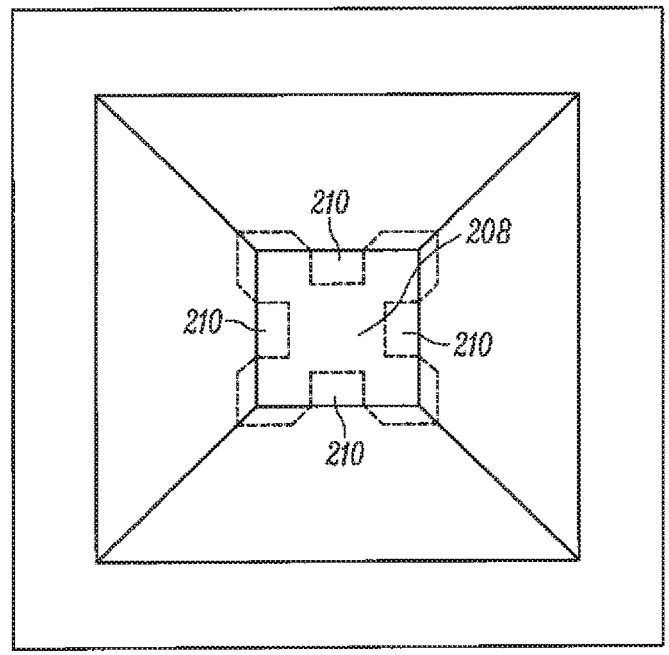
FIG. 5A is a bottom view of the pressure sensing element shown in FIG. 2 but showing the location of the recess formed into the top surface of the diaphragm which is formed into the bottom surface of the substrate.
Figure 5B:
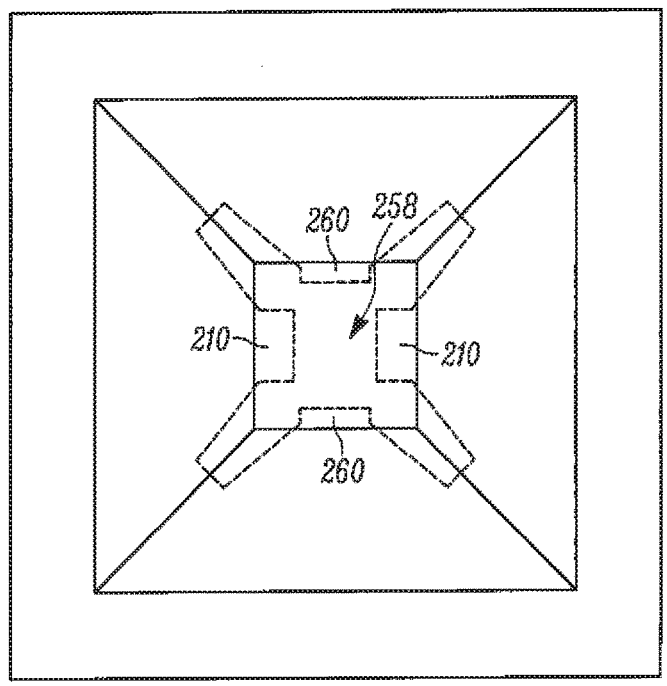
FIG. 5B is a bottom view of an alternate embodiment of the pressure sensing element shown in FIG. 2 depicting a recess formed into the top surface of the diaphragm, the shape of which is different from that shown in FIG. 5A.

FIG. 5A is a bottom view of the pressure sensing element 200 depicted in FIG. 2. FIG. 5A also shows the shape of the recess 208 formed into the top side 204 and anchors 210 formed by etching the substrate material. FIG. 5B is a bottom view of an alternate embodiment of the pressure sensing element 200 shown in FIG. 2 depicting an asymmetric recess 258 formed into the top surface of the diaphragm 306, the shape of which is different from that shown in FIG. 5A. Two pairs of anchors 210 and 260 are formed from the asymmetric recess 258.

It is well known that a polygon is "regular" when all of its angles are equal and the lengths of all of its sides are equal, otherwise a polygon is "irregular." The shape of the recess 208 is considered herein to be a closed irregularly-shaped polygon due mainly to the size of the anchors relative to the perimeter of the recess.

As best seen in FIG. 3, the thickness, t, of the diaphragm 306 is quite thin, preferably between about 2.0 and about 5.0 microns. The anchors 210, however, have a greater thickness, about 7.0 up to about 15.0 microns.

Figure 6A:
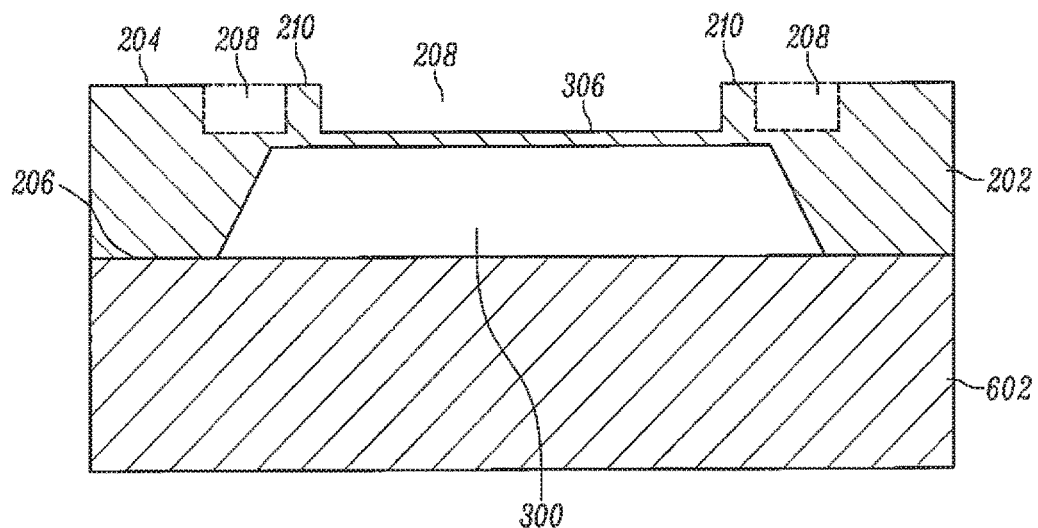
FIG. 6A shows a cross-section view of the pressure sensing element with topside anchors bonded with a substrate at the bottom for topside absolute pressure sensing.
Figure 6B:
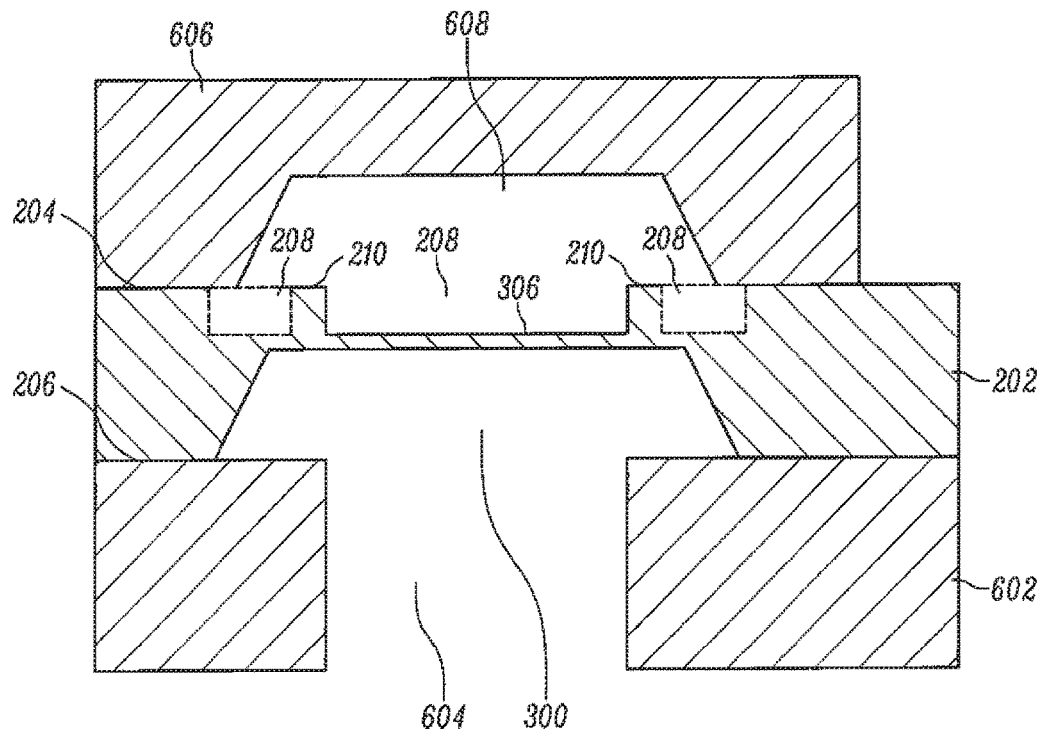
FIG. 6B shows a cross-section view of the pressure sensing element with topside anchors bonded with a substrate at the bottom with a through-hole and another substrate as a cap at the top for backside absolute pressure sensing.

As best seen in FIG. 6A, the pressure sensing element with topside anchors 210 shown in FIGS. 2-5 is preferably supported by a second substrate or pedestal 602, preferably made of glass, for topside pressure sensing. The second substrate 602 is preferably made of either silicon or glass and is attached to the bottom surface 206 of the first substrate 202. In one embodiment, the second substrate 602 is provided with a through-hole 604 as shown in FIG. 6B. The through-hole 604 allows fluid in the hole 604 to exert pressure against the backside of the diaphragm 306 formed into the top of the first substrate 202 for differential pressure sensing. An optional cap 606 can be placed over the top side of the diaphragm 306, i.e. over the top surface 204 of the substrate 202 to define an evacuated cavity 608 above the top side of the diaphragm 306. The cap 606 protects the top side of the diaphragm 306 and prevents pressure from being applied to the top surface of the diaphragm 306 for backside pressure sensing.

Figure 7:
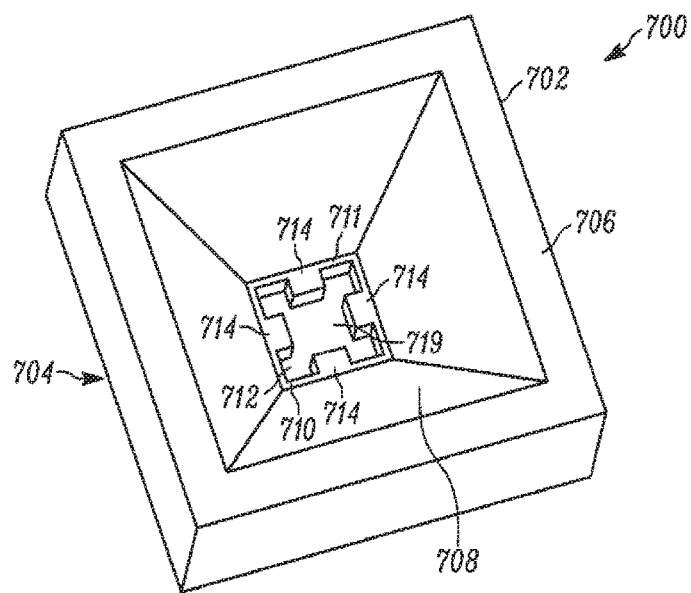
FIG. 7 is a bottom view of a pressure sensing element comprising a recess formed into the bottom of a substrate to define a rim and anchors after the cavity is etched.

FIG. 7 depicts a bottom view of an alternate embodiment of a pressure sensing element 700. The pressure sensing element 700 comprises a substrate 702 having a top side 704, not visible in FIG. 7, and a bottom side 706. The bottom side 706 has a cavity 708 having a pyramid-like shape, similar to the shape of the cavity 300 formed into the substrate shown in FIGS. 2-6.

Figure 8:
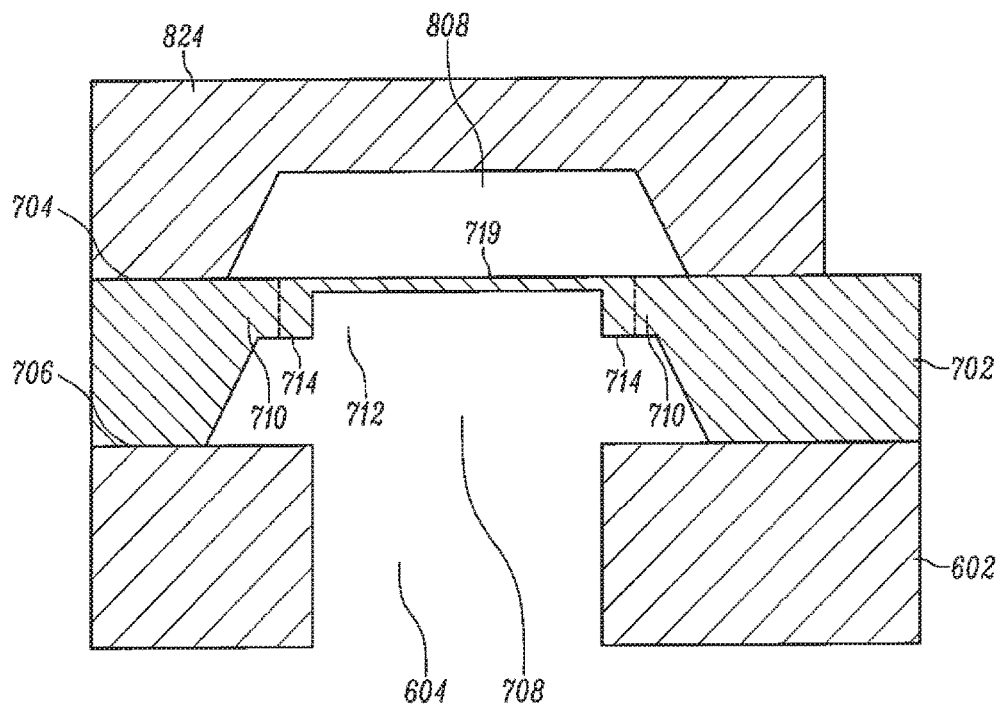
FIG. 8 is a cross-sectional view of the pressure sensing element with backside anchors as shown in FIG. 7 plus a glass pedestal with a through-hole at the bottom and a cap on the top.

The cavity 708 shown in FIG. 7 is formed into the bottom surface 706 of the substrate 702. The cavity 708 is formed to provide a substantially planar surface 711. The planar surface 711 is further etched to form a recess 712 with a rim 710 and four anchors 714 surrounding the recess 712. Each of the four anchors 714 is located near the center of each diaphragm edge at the bottom surface which is at the same elevation as the planar surface 711. The four anchors 714 are extended inwardly from each side of the rim 710. A thinner corrugated diaphragm 719 as shown in FIG. 8 is thus formed by the rim 710, the recess 712, and the four anchors 714. The thinner portion of the diaphragm 719 is used to increase pressure sensitivity and the rim and anchors are used to reduce pressure nonlinearity.

FIG. 8 is a cross-sectional view of the pressure sensing element depicted in FIG. 7, showing the cavity 708 in the bottom side and a recess 712 further formed into the cavity 708 of the substrate 702.

As with the pressure sensing element depicted in FIGS. 2-6, the recess 712 formed in the bottom surface of the substrate 702 is a closed polygon shape. The diaphragm 719 thickness away from the anchors 714 is between about 2.0 and about 5.0 microns. The anchors 714 and the rim 710, however, are thicker, having thicknesses between about 7.0 and 15.0 microns.

Similar to the pressure sensing element 200 shown in FIG. 2, the pressure sensing element 700 shown in FIG. 7 can also be provided with a second substrate 602 as shown in FIG. 8 with a through-hole 604 for differential pressure sensing. The second substrate 602, also known as a pedestal, is preferably made of glass. A cap 824 with a vacuum cavity 808 can also be placed over the top surface 704 with an evacuated cavity 808 for backside absolute pressure sensing.

FIG. 9 is a table depicting performances of prior art pressure sensing elements and the pressure sensing elements depicted herein for 1 Bar topside absolute pressure sensing using a 300 um diaphragm. For a diaphragm thickness of about 7 micrometers, a conventional prior art flat diaphragm has a span voltage of about 22.36 millivolts. The top cross, described in claim in Applicant's co-pending application number 2014P05613US has an improved span voltage at 32.99 millivolts, improved by about 48%; however, the span voltage of a diaphragm supported by anchors only, and as described herein has yet an even greater span voltage of about 43.14 millivolts. The span ratios also improve over the prior art structures although the pressure nonlinearity is slightly higher but still within the pressure nonlinearity requirement, +/−1.5%.

Similar performance improvements have been realized with diaphragms of about 10 micrometers in thickness. Span voltages between the top cross braced diaphragm versus the anchor-only diaphragm are nearly 50% better. The pressure nonlinearity is pretty low within +/−1.5%.

Figure 10:
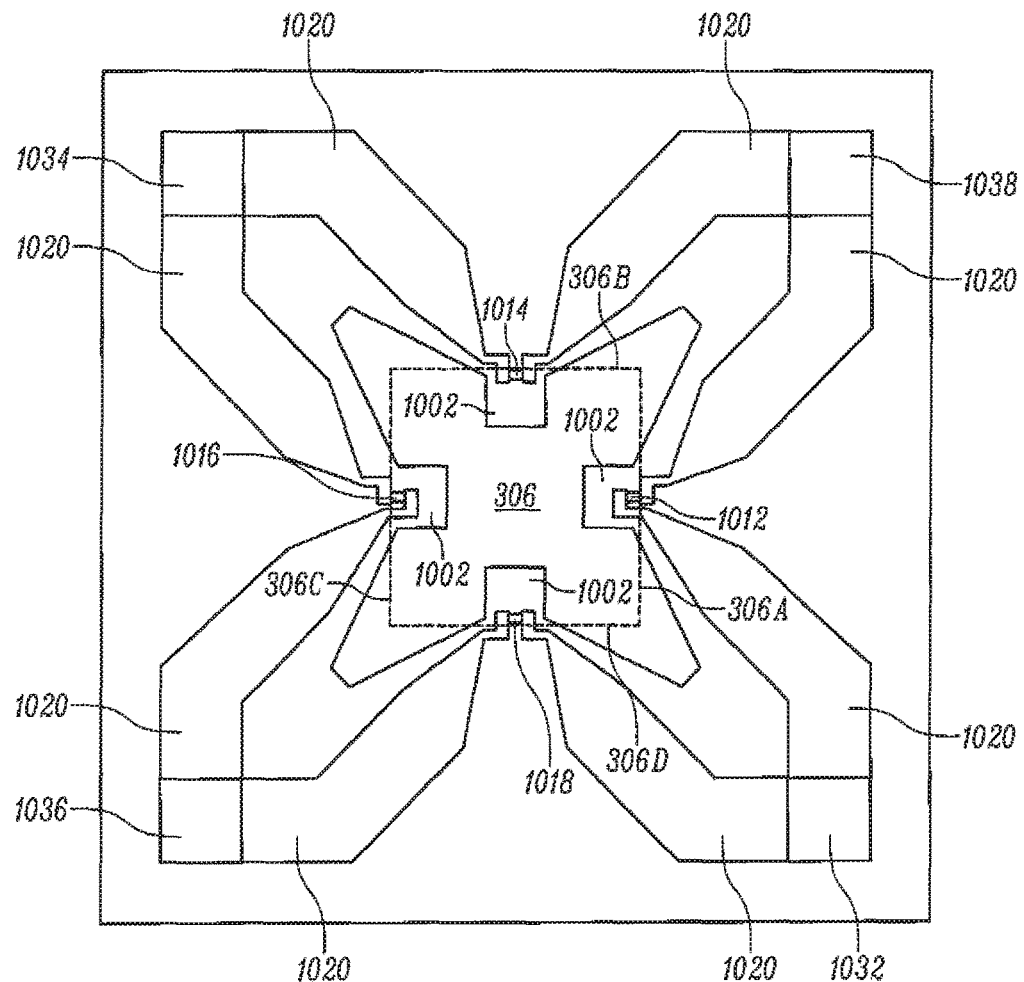
FIG. 10 is a top view of a pressure sensing element with symmetric topside anchors.
Figure 11:
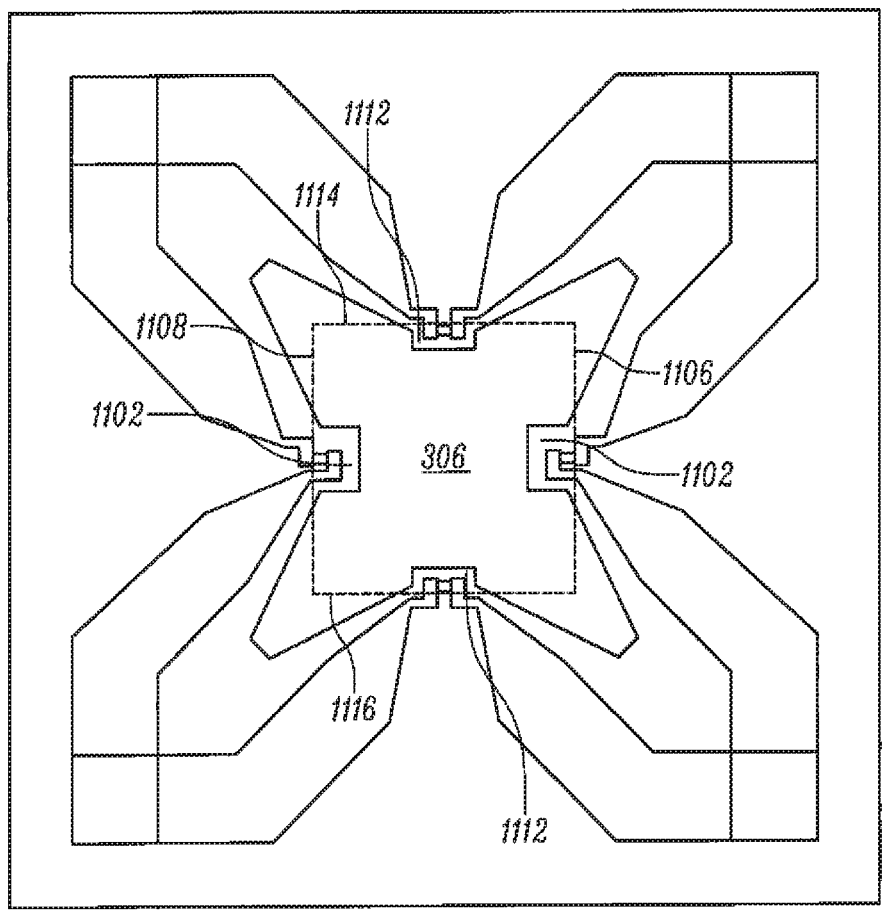
FIG. 11 is a top view of a pressure sensing element with asymmetric topside anchors.

Finally, FIGS. 10 and 11 depict symmetric and asymmetric topside anchors, respectively. In FIG. 10, the anchors 1002 are substantially the same size and have substantially the same surface area. In FIG. 11, however, two longer anchors 1102 which are on opposite sides 1106 and 1108 of a diaphragm 306 are larger or longer than shorter anchors 1112 on opposite sides 1114 and 1116 of the diaphragm 306.

FIG. 10 depicts a plan view of the top surface 204 of the pressure sensing element 200 shown in FIG. 6A with symmetric topside anchors. Four piezoresistors 1012, 1014, 1016 and 1018 are formed by depositing P-type semiconductor material into the area of the anchors 1002 on the top surface 204 of the pressure sensing element 200. The piezoresistors 1012, 1014, 1016 and 1018 are considered to be "distributed" elements because they are not confined to one side or edge of the diaphragm 306 but are instead separated from each other and located along the sides 306A, 306B, 306C and 306D of the square-shaped diaphragm 306.

The piezoresistors are connected to each other by conductors 1020, which are formed by P+ conductive material deposited into the top surface 204 of the pressure sensing element 200. The P+ conductors 1020 extend from each end of a piezoresistor outwardly and connect to metal bond pads 1032, 1034, 1036, and 1038 for the input and output voltages to form a Wheatstone bridge circuit.

Two loops of circuits are used to connect the metal bond pad 1032 to the metal bond pad 1034 for an input signal and each loop comprises two piezoresistors and two pairs of the P+ connectors. Another two loops of circuits are used to connect the metal bond pad 1036 to the metal bond pad 1038 for an output signal and similarly each loop consists of two piezoresistors and two pairs of the P+ connectors.

As shown in FIG. 11, the asymmetric anchors have been experimentally determined to increase the span or sensitivity of the diaphragm but may introduce some higher pressure nonlinearity or electrical noise.

The foregoing description is for purposes of illustration only. The true scope of the invention is set forth in the following claims.

What is claimed is:

1. A pressure sensing element comprising:
a first substrate having top and bottom sides;
a diaphragm formed as part of the top side and as part of the bottom side, the diaphragm having top and bottom sides, the bottom side of the diaphragm having a substantially square bottom area and a substantially square bottom outer perimeter, the top side of the first substrate having a top area and a top outer perimeter inner portions of which form the top side of the diaphragm and which extend out along the top side of the first substrate further than the bottom area and the bottom outer perimeter;
a recess formed into the top surface of the diaphragm, the recess being sized and shaped to define four anchors, the anchors being spaced apart from each other in the recess such that each anchor is formed near each diaphragm edge center; and
a piezoresistor formed into a top surface of each anchor.

2. The pressure sensing element of claim 1 wherein the recess is a closed irregular polygon.

3. The pressure sensing element of claim 1 herein the anchors are symmetric.

4. The pressure sensing element of claim 1 herein the anchors are asymmetric.

5. The pressure sensing element of claim 1 herein the piezoresistors are connected to each other to form a Wheatstone bridge.

6. The pressure sensing element of claim 1, wherein the diaphragm has a thickness between about 2.0 and about 5.0 microns and wherein the anchors have a different thickness between about 7.0 and about 15.0 microns.

7. The pressure sensing element of claim 1, further comprising a second substrate attached to the bottom of the first substrate.

8. The pressure sensing element of claim 7 wherein the second substrate having a hole, which is aligned with the diaphragm and configured to conduct a fluid toward the bottom side of the diaphragm.

9. The pressure sensing element of claim 7, further comprising a cap that covers the top side of the diaphragm and which defines a cavity above the top side of the diaphragm.

10. A pressure sensing element comprising:
a first substrate having top and bottom sides;
a cavity formed into the bottom of the first substrate, the cavity being sized and shaped to form a thin diaphragm in the first substrate, the diaphragm having a top surface and an opposing bottom surface in the cavity;
a recess formed into the bottom surface of the diaphragm, the recess being sized and shaped to define a rim around the recess and four anchors, which extend from the rim, inwardly and toward each other, the anchors being spaced apart from each other in the recess such that each anchor is formed near each diaphragm edge center;
wherein the rim forms as part of the bottom surface of the diaphragm and stiffens perimeter regions of the bottom surface of the diaphragm so as to prevent cavity corner over-etching and to improve pressure accuracy; and
a piezoresistor formed into a top surface of each anchor.

11. The pressure sensing element of claim 10, wherein the recess is a closed polygon.

12. The pressure sensing element of claim 10, wherein the anchors are symmetric.

13. The pressure sensing element of claim 10, wherein the anchors are symmetric.

14. The pressure sensing element of claim 10, wherein the piezoresistors are connected to each other to form a Wheatstone bridge.

15. The pressure sensing element of claim 10, wherein the diaphragm has a thickness between about 2.0 and about 5.0 microns and wherein the anchors have a different thickness between about 7.0 and about 15.0 microns.

16. The pressure sensing element of claim 10, further comprising a second substrate attached to the bottom of the first substrate.

17. The pressure sensing element of claim 16, wherein the second substrate having a hole, which is aligned with the diaphragm and configured to conduct a fluid toward the bottom side of the diaphragm.

18. The pressure sensing element of claim 17, further comprising a cap that covers the top side of the diaphragm and which defines a cavity above the top side of the diaphragm.

* * * * *